A. J. GOING.

Cotton-Bale Ties.

No. 5,553. Reissued August 26, 1873.

Witnesses:
A. Sidquick
Alex T. Roberts

Inventor:
A. J. Going
Per
Munn & Co
Attorneys.

THE NORRIS PETERS CO., PHOTO-LITHO., WASHINGTON, D. C.

UNITED STATES PATENT OFFICE.

ANDREW J. GOING, OF CLINTON, LOUISIANA.

IMPROVEMENT IN COTTON-BALE TIES.

Specification forming part of Letters Patent No. 137,301, dated April 1, 1873; reissue No. 5,553, dated August 26, 1873; application filed July 12, 1873.

*To all whom it may concern:*

Be it known that I, ANDREW J. GOING, of Clinton, in the parish of East Feliciana and State of Louisiana, have invented a new and useful Improvement in Bale-Ties, of which the following is a specification:

The object of this invention is to provide a cheap, simple, and convenient bale-tie for cotton and other balable commodities; and it consists in a band or piece of iron or other suitable metal, provided at each end, or near each end, with slots, thus forming tongues, which adapts the ends of the tie to be joined and the same to be applied to a bale, as herein shown and described.

Figure 1:
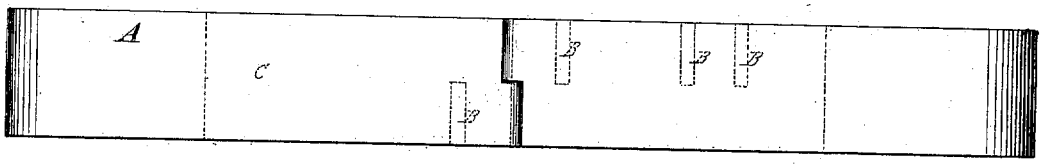
Figure 2:
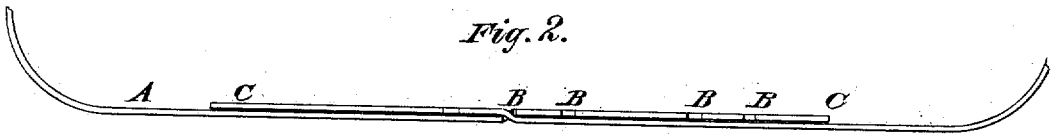
Figure 3:
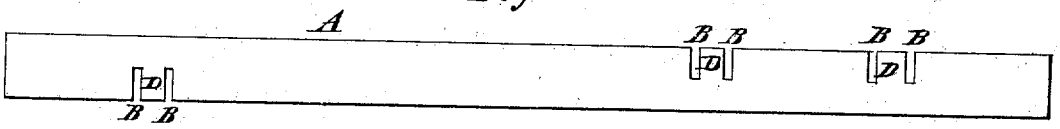

In the accompanying drawing, Figures 1 and 2 are, respectively, side and edge views of a portion of the tie as it appears when the ends are locked together in the manner I preferably adopt. Fig. 3 represents the band on a smaller scale, and flattened out to show the ends and the slots and tongues.

Similar letters of reference indicate corresponding parts.

A is the band or strip of metal. B represents slots cut half-way through the band from opposite edges thereof, as seen in Fig. 3, forming slots between them.

The band is applied to a bale with the ends inside and next the bale, as shown in Figs. 1 and 2, the slots and tongues interlocking, so as to hold firmly together and yet admit of being readily disengaged when required.

The number of slots and tongues may be varied to adapt the tie to bales of different sizes.

A simple, convenient, and effective tie is thus formed, presenting a smooth and uniform outside surface, with the ends effectually secured, as represented.

Having thus described my invention, I claim as new and desire to secure by Letters Patent—

A bale-tie constructed with slots B and tongues D formed on opposite sides thereof, so that its ends may be locked together, substantially as shown and described.

ANDREW JACKSON GOING.

Witnesses:
ROBT. G. KOCH,
JACOB GUTH, Jr.